(12) United States Patent
Lago

(10) Patent No.: US 10,689,199 B2
(45) Date of Patent: Jun. 23, 2020

(54) BAR CONVEYOR

(71) Applicant: TECNO POOL S.P.A., San Giorgio In Bosco (IT)

(72) Inventor: Leopoldo Lago, Cittadella (IT)

( * ) Notice: Subject to any disclaimer, the term of this patent is extended or adjusted under 35 U.S.C. 154(b) by 0 days.

(21) Appl. No.: 16/485,908

(22) PCT Filed: Feb. 20, 2018

(86) PCT No.: PCT/IB2018/051020
§ 371 (c)(1),
(2) Date: Aug. 14, 2019

(87) PCT Pub. No.: WO2018/154430
PCT Pub. Date: Aug. 30, 2018

(65) Prior Publication Data
US 2020/0039751 A1 Feb. 6, 2020

(30) Foreign Application Priority Data

Feb. 21, 2017 (IT) .................... 10-2017-000019182

(51) Int. Cl.
*B65G 17/06* (2006.01)
*B65G 17/42* (2006.01)
*A21B 1/46* (2006.01)

(52) U.S. Cl.
CPC .............. *B65G 17/064* (2013.01); *A21B 1/46* (2013.01); *B65G 17/067* (2013.01); *B65G 17/42* (2013.01)

(58) Field of Classification Search
CPC .... B65G 15/54; B65G 17/063; B65G 17/064; B65G 17/067; B65G 17/068; B65G 17/34;
(Continued)

(56) References Cited

U.S. PATENT DOCUMENTS 1,756,598 A * 4/1930 King ...................... B65G 15/54
198/683
3,096,875 A * 7/1963 Rudolph ................ A01D 17/10
198/848
(Continued)

FOREIGN PATENT DOCUMENTS

JP S51127593 U 10/1976
JP H06141985 5/1994
(Continued)

*Primary Examiner* — Gene O Crawford
*Assistant Examiner* — Keith R Campbell
(74) *Attorney, Agent, or Firm* — Themis Law

(57) ABSTRACT

A continuous bar conveyor includes a plurality of bars, constrained at their ends by chains having links adapted to be engaged by motorized toothed wheels, so as to move the conveyor along fixed guides, and a plurality of spirals wrapping the bars in pairs, the links of the chains and the spirals limiting the maximum distance between adjacent bars, but also allowing their reciprocal movement, wherein, between adjacent successions of at least two bars wrapped by a spiral, there is at least one bar that is not wrapped by spirals, and to which a sheet of plastic material is constrained, having an elevated resistance to the operating temperature of the conveyor and a smooth, non-stick surface, the sheet resting on the upper surface defined by the spirals and having a dimension in the advancing direction of the conveyor smaller than the distance between successive bars not wrapped by spirals.

14 Claims, 1 Drawing Sheet

(58) Field of Classification Search
CPC .... B65G 17/42; B65G 2207/44; A47J 37/045; A21B 1/46
See application file for complete search history.

(56) References Cited

U.S. PATENT DOCUMENTS

| | | | | |
|---|---|---|---|---|
| 3,447,668 | A * | 6/1969 | Jernigan | B65G 17/067 198/834 |
| 5,423,416 | A * | 6/1995 | Kucharski | B65G 17/064 198/690.2 |
| 7,841,462 | B2 * | 11/2010 | Layne | B65G 17/063 198/778 |
| 7,987,972 | B2 * | 8/2011 | Hennigar | B65G 17/067 198/848 |
| 9,889,992 | B1 * | 2/2018 | Adomaitis | A47J 37/045 |
| 10,315,847 | B2 * | 6/2019 | Malkowski | B65G 17/42 |
| 10,486,908 | B2 * | 11/2019 | Adomaitis | A47J 37/045 |
| 2017/0210567 | A1 * | 7/2017 | Malkowski | A47J 37/0857 |

FOREIGN PATENT DOCUMENTS

| | | |
|---|---|---|
| WO | 2007140242 | 12/2007 |
| WO | 2012150414 | 11/2012 |

* cited by examiner

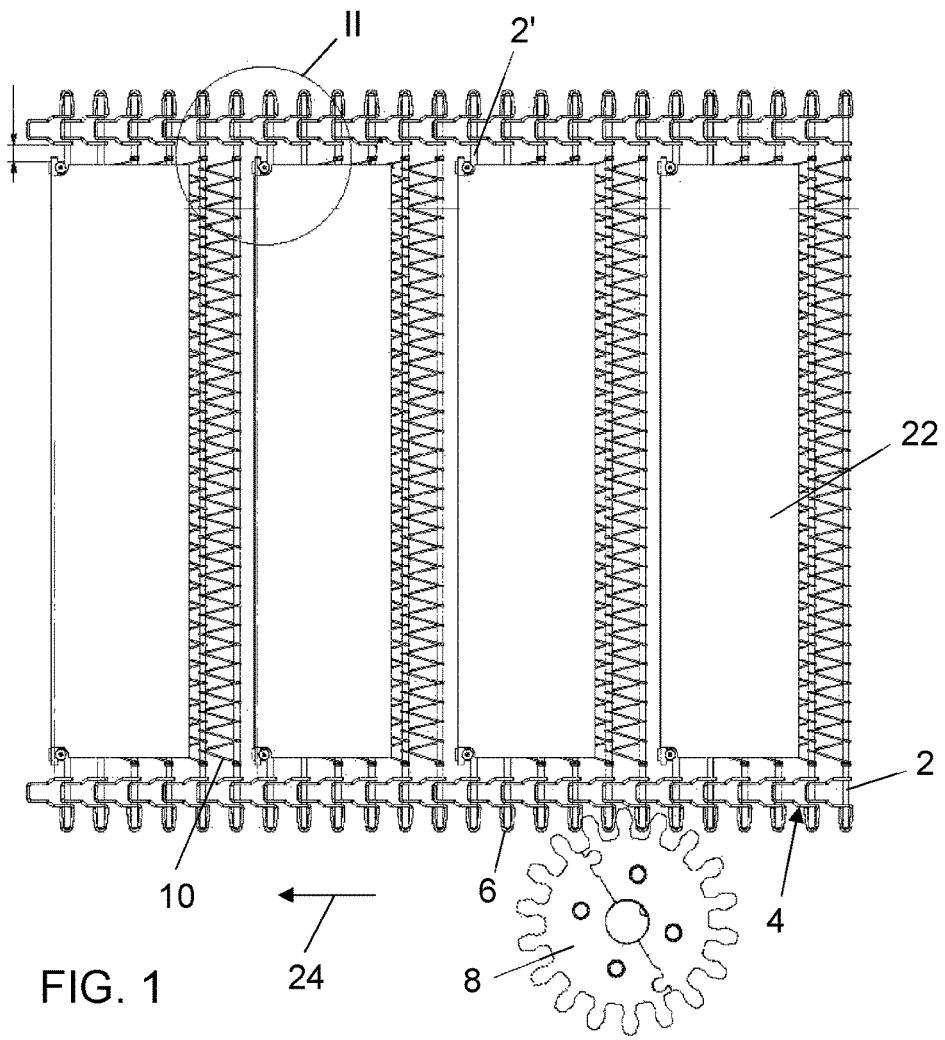
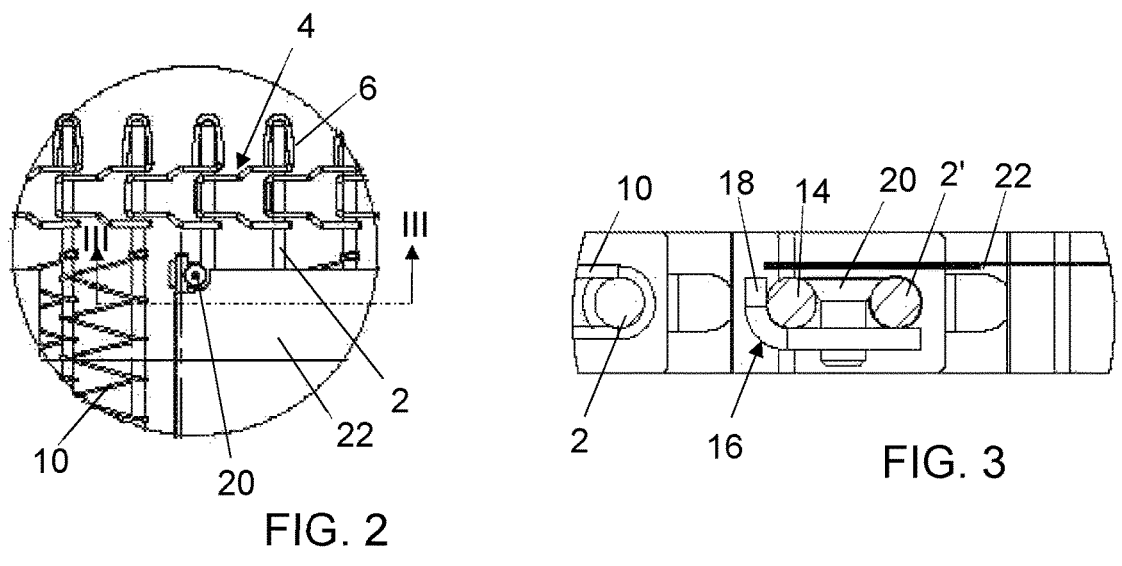
FIG. 1
FIG. 2
FIG. 3

BAR CONVEYOR

The present invention relates to a continuous bar conveyor for the food industry.

Continuous conveyors in plants are known in the food industry for transferring products within an area or from one area to another.

They are used in various plants and/or machinery and, in particular, in ovens, provers and the like.

One known type of continuous conveyor comprises a plurality of transverse rods or bars, joined to one another at the ends by chains having the links shaped, so as to prevent one bar and another bar from moving apart beyond a predetermined measurement, while at the same time allowing them to move together to a certain degree, which is necessary for the belt to be able to position itself according to a curved development. Furthermore, the links of the chain are shaped, so that they can be engaged by motorized toothed wheels, making the same belt advance along rectilinear or curvilinear guides, according to the desired path to be completed by the belt.

The products to be treated for being advanced from one machine to another, or also inside a machine, composed of an oven, a dryer, a prover or the like, are placed on this typology of conveyor belt.

Since the distance between the adjacent bars of the conveyor would be incompatible with the dimensions of the pieces to be treated, especially if they are not placed in containers, but directly onto the conveyor, it would be impossible to place them directly onto the bars, without the risk of them falling in between one bar and another bar. Consequently, the wrapping of successive pairs of adjacent bars is known with a metal spiral with flattened coils, having the object of creating a sort of discontinuous filiform surface for placing the food products to be moved.

The configuration of the spirals is such as to allow the bars to move towards one another inside the same spirals and adopt a slightly inclined position in the curved sections of the path, wherein a relative movement between bars and spirals occurs, but it is also such as to prevent them from moving apart beyond a predetermined measurement.

The coils of each spiral are realized so that they are not excessively spaced apart from one another, to prevent small-sized products from falling, but also so that they are not too close to one another, since this would be detrimental to the weight of the entire conveyor and its production cost. However, in the presence of particularly delicate products, the filiform spirals can "mark them" and, in some cases, they are unable to prevent them from collapsing and invading the space between the coils, intended for the movement of the bars during the passage of the conveyor from a rectilinear path to a curvilinear path and vice versa.

Apart from the undesired effect of the marking of the finished products, the penetration of the dough between the coils results in the soiling of the bars and the spirals and the need for frequent and laborious interventions of cleaning.

U.S. Pat. No. 1,756,598 describes a bar conveyor, for example, in which the successive bars are wrapped with spirals, and which is provided with a sheet, resting on the upper surface defined by said spirals. However, this solution is not entirely satisfactory, since the securing of the sheet to the bars is rather complicated and laborious.

It is an object of the invention to eliminate the drawbacks of the traditional solutions and be able to transport delicate products without the risk of marking them.

It is a further object of the invention to prevent a part of the delicate products being carried from being able to fall inside the spirals and consequently suffer damage.

It is a further object of the invention to prevent the soiling of the spirals and bars and the frequent interventions of their cleaning.

It is a further object of the invention to be able to modify a traditional bar conveyor, so that it can be used for delicate products.

It is a further object of the invention to propose a conveyor, which has an alternative and/or improved embodiment, both structurally and functionally with respect to the traditional ones.

It is a further object of the invention to propose a conveyor, which can be realized quickly and easily and with contained costs.

All of these objects, considered both separately and in any combination, as well as others, which will result from the following description, are achieved according to the invention with a continuous bar conveyor for the food industry as defined in claim 1.

The present invention is further clarified below in a preferred practical embodiment illustrated purely by way of example, which is not limiting, with reference to the appended drawings, wherein:

FIG. 1 shows a plan view of a portion of the bar conveyor according to the invention, FIG. 2 shows the enlarged detail enclosed by the circular line II in FIG. 1, and FIG. 3 shows it according to the enlarged section III-III in FIG. 2.

As can be seen from the figures, the bar conveyor according to the invention is rather similar to a traditional conveyor in that it is composed of a plurality of bars 2, at the ends of which two chains 4 are applied with concatenated links.

Opportunely, the links 4 are configured and concatenated, so as to limit the maximum distance between the single bars and, at the same time, allow them to be brought together to adopt a slightly angled reciprocal arrangement, also in keeping with the needs of the conveyor to move according to a curved development.

Opportunely, like the chains of the traditional bar conveyors, the chains 4 of the conveyor according to the invention also have links 6 with a conformation suitable for being engaged by motorized toothed wheels 8, causing the conveyor to advance along guides, which develop according to the path to be completed by the conveyor.

Opportunely, like the traditional bar conveyors, preferably, the adjacent bars 2 are wrapped in pairs by spirals 10 with flattened coils, defining a sort of discontinuous resting surface between one bar and another for the products to be moved on the conveyor.

However, unlike the traditional bar conveyors, in the conveyor according to the invention every successive/adjacent "n" bars 2, and in the example shown, every five successive bars 2, preferably in twos wrapped by a spiral 10, at least one bar 2' is provided, which is not influenced by spirals 10, thus delimiting transverse spaces without spiral 10 with the two adjacent bars 2. Preferably, the number "n" of successive/adjacent bars 2 wrapped by the spiral 10 is predetermined and constant, or it may also vary.

Advantageously, an additional bar 14 is detachably applied to the bar 2' not influenced by spirals 10, which is, opportunely, slightly shorter than the bars 2, 2', and not engaged with the ends in the links 6 of the chains 4. Opportunely, the additional bar 14 is coplanar to the bars 2 and 2'.

Each additional bar 14 is constrained to the bar 2' with its end portions by opportune hooking means, which advantageously comprise two clamps 16. In particular, each clamp 16 is made up of a curved plate 18, constrained, for example, by means of welding, to the bar 2' and to the additional bar 14 and it is held stably in place, preferably by means of the countersunk head of a screw 20, engaged in a threaded hole obtained in the plate 18.

A rectangular sheet 22 of plastic food material is applied to the additional bar 14.

Advantageously, the sheet 22 has a substantially smooth, non-stick surface. Opportunely, the sheet 22 also has elevated resistance to the temperature at which the conveyor according to the invention is designed to operate.

Advantageously, the sheet 22 is made of Teflon. Preferably, the sheet 22 is made entirely of Teflon. Alternatively, at least the upper surface of the portion of the sheet 22, on which the carried products are intended to be placed, is made of Teflon.

Opportunely, each sheet 22 has a larger side, which is folded, forming a tubular seat for housing the respective additional bar 14 and preferably, it develops in the advancing direction of the belt, indicated by the arrow 24 in FIG. 1, covering most of the bars 2 wrapped by spiral 10, comprised between two additional successive bars 14.

In the example shown, the Teflon sheet 22 extends covering three bars 2 wrapped by spiral 10, leaving two of them free. However, it is also possible to have greater coverage of bars 2 wrapped by spiral 10 by each sheet 22, whose measurement in the direction of the longitudinal development of the belt is limited only by the need to prevent adjacent sheets 22 from overlapping, in a state of maximum inclination between the bars 2, in other words, in correspondence with the smallest curvature radius, with which the belt must be able to position itself.

During operation of the belt, the products to be carried are placed on the single sheets 22 by hand or, more preferably, by a traditional automatic feeder.

Opportunely, thanks to the substantially smooth continuous surface of the sheet, the single pieces to be treated, receive constant support and do not suffer any undesired consequences, not even if they are particularly delicate. Furthermore, thanks to the non-stick nature of the Teflon sheet 22, after treatment, they can be removed from the same sheet on which they are positioned in an extremely simple manner, without any drawbacks.

Furthermore, the particularly limited thickness of the sheet 22 doesn't require any substantial increase in size of the conveyor vertically and consequently requires no alterations to the conveyor for traditional automatic feeders of products.

Opportunely, since the sheets 22 can be applied to preselected bars 2' of a traditional conveyor, which remains, for the rest, unaltered, the conveyor according to the invention can be obtained with modifications executable on traditional conveyors, from which the spirals 10 for connecting adjacent bars 2 are removed, at predetermined distances, to create bars 2' without spirals 10, to which the additional bars 14 for constraining the sheets 22 are then applied.

Furthermore, unlike the traditional bar conveyors, in the bar conveyor according to the invention, the spirals 10 no longer serve to support the products to be carried directly, but the sheets 22 on which the products to be carried are placed and therefore, the spirals themselves can have the coils spaced further apart from one another, consequently benefiting the overall weight and cost of the conveyor itself.

The invention claimed is:

1. A continuous bar conveyor adapted for use in a food industry, comprising:
   a plurality of bars, having ends constrained by chains having links configured to be engaged by motorized toothed wheels, so as to move the continuous bar conveyor along fixed guides; and
   a plurality of spirals wrapping said bars in pairs, said links of said chains and said spirals being configured to limit a maximum distance between adjacent bars of the plurality of bars, but also to allow a reciprocal movement of the adjacent bars together,
   wherein, between adjacent successions of at least two bars of the plurality of bars, wrapped by one of the plurality of spirals, there is disposed at least one bar of the plurality of bars, which is not wrapped by the spirals, and to which a sheet of plastic material is constrained, having resistance to an operating temperature of said conveyor and a smooth, non-stick surface, said sheet resting on an upper surface defined by said spirals and having a dimension in an advancing direction of the continuous bar conveyor smaller than a distance between successive bars of the at least one bar not wrapped by the spirals.

2. The continuous bar conveyor according to claim 1, wherein said bars not wrapped by the spirals are provided after every predetermined constant number of the bars wrapped by the spiral.

3. The continuous bar conveyor according to claim 1, wherein said successions of at least two bars wrapped by the spiral are wrapped in pairs.

4. The continuous bar conveyor according to claim 1, wherein there is one of the bars not wrapped by the spirals every five of the bars wrapped by the spirals.

5. The continuous bar conveyor according to claim 1, wherein said sheet of plastic material is constrained along one side to an auxiliary bar, a length of the auxiliary bar being smaller than a length of said bars constrained and not constrained by the spirals, the auxiliary bar being constrained, in turn, to said bar not wrapped by the spirals.

6. The continuous bar conveyor according to claim 5, wherein said auxiliary bar has ends not engaged in the links of the chains.

7. The continuous bar conveyor according to claim 5, wherein said auxiliary bar is coplanar to said bars constrained and not constrained by the spirals.

8. The continuous bar conveyor according to claim 5, wherein, in correspondence with end portions of said auxiliary bar, said auxiliary bar is detachably constrained to one of said bars not wrapped by the spirals by a hook.

9. The continuous bar conveyor according to claim 5, wherein said auxiliary bar is detachably constrained to said bar not wrapped by the spirals by a pair of clamps.

10. The continuous bar conveyor according to claim 9, wherein each clamp comprises a curved bar provided with a threaded hole engageable by a screw and configured to simultaneously hold said bar not wrapped by the spirals and said auxiliary bar by clamping with a head of said screw.

11. The continuous bar conveyor according to claim 5, wherein said sheet comprises a wrapped strip defining a tubular seat engaged by said auxiliary bar.

12. The continuous bar conveyor according to claim 1, wherein said sheet is made of Teflon.

13. The continuous bar conveyor according to claim 1, wherein said sheet comprises a rectangular-shaped portion defining a full and continuous base for placing products to be carried.

14. The continuous bar conveyor according to claim 1, wherein said sheet extends longitudinally in a direction of an adjacent sheet to such an extent as to leave uncovered at least one of the bars wrapped by the spirals.

* * * * *